United States Patent [19]
Dobozy

[11] Patent Number: 5,316,224
[45] Date of Patent: May 31, 1994

[54] METHOD AND APPARATUS FOR RECOVERING ELASTOMERIC MATERIAL

[76] Inventor: John Dobozy, 62 Mingoletta Drive, Ashmore, Queensland 4214, Australia

[21] Appl. No.: 847,025
[22] PCT Filed: Oct. 10, 1990
[86] PCT No.: PCT/AU90/00484
§ 371 Date: Jun. 10, 1992
§ 102(e) Date: Jun. 10, 1992
[87] PCT Pub. No.: WO91/05818
PCT Pub. Date: May 2, 1991

[30] Foreign Application Priority Data
Oct. 10, 1989 [AU] Australia .................... 6768

[51] Int. Cl.$^5$ .............................. C08J 11/04
[52] U.S. Cl. .............................. 241/30; 241/20; 241/23
[58] Field of Search .................... 241/30, 17, 20, 23, 241/24, DIG. 31

[56] References Cited
FOREIGN PATENT DOCUMENTS
1595810  8/1981  United Kingdom .

Primary Examiner—Douglas D. Watts
Attorney, Agent, or Firm—Reese Taylor

[57] ABSTRACT

A method for recovering elastomeric material such as rubber from tires comprising the steps of soaking the tires in a mixture of liquids in tanks which soften the rubber, subjecting the softened tires to shear conditions in the rubber, and recovering the rubber and drying it in a drier. In this method grinding of the tire is not required. The recovered dried rubber can be carbonized in a microwave chamber to form a substitute for products such as carbon black formed by burning fossil fuels. A screw conveyor provides the preferred means to remove the softened rubber by a shearing action.

15 Claims, 4 Drawing Sheets

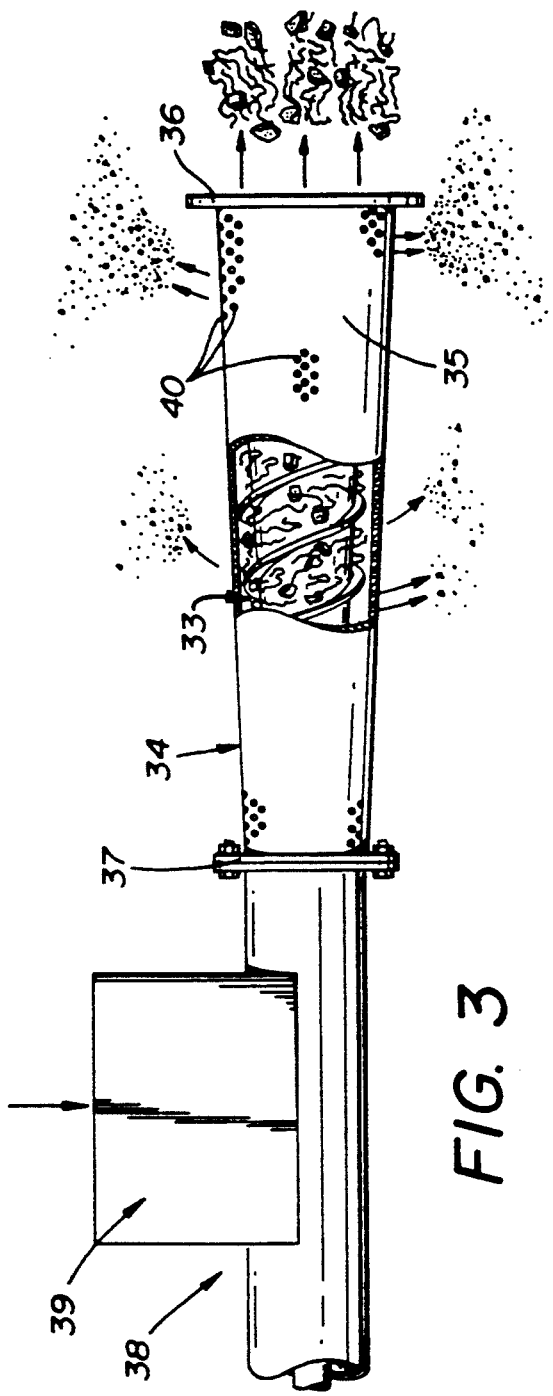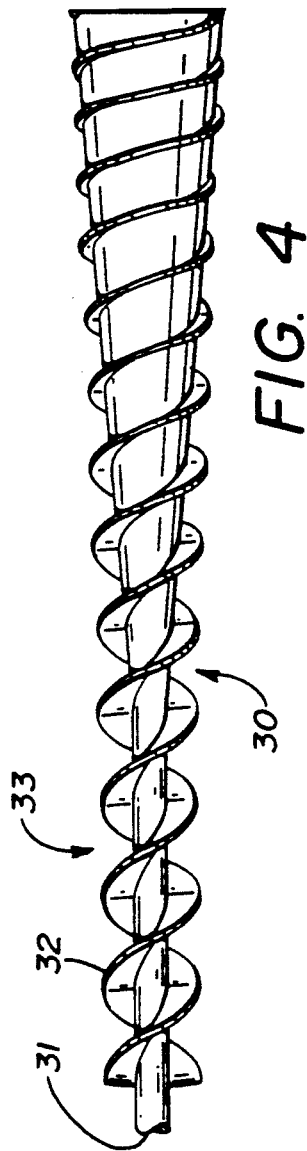

METHOD AND APPARATUS FOR RECOVERING ELASTOMERIC MATERIAL

TECHNICAL FIELD

This invention relates to a method for recovering elastomeric material from articles containing such material and to apparatus for performing such a method. The method is particularly suitable for recovering rubber from vehicle tires, or other rubber or elastomeric material containing articles.

BACKGROUND ART

Recovery of elastomeric material such as rubber from articles containing such material is increasingly popular due to the increasing costs of manufacture of the raw elastomeric material.

Used articles containing elastomeric material such as vehicle tires are currently not recycled but instead are discarded or dumped.

Such dumping poses a severe environmental problem and also results in the loss of a large amount of recoverable elastomeric material.

A significant source of recoverable elastomeric material comes from used vehicle tires, rubber conveyor belts or other such rubber containing products. Vehicle tires are normally discarded after a predetermined wear on the tread on the vehicle tire or upon damage of the vehicle tire however such used tires still contain a large amount of recoverable rubber.

Recovering elastomeric material from articles which consist entirely of such material can be carried out by cutting, shredding or grinding of the elastomeric material followed by recycling.

However, most articles containing elastomeric material also contain non-elastomeric material such as reinforcement and hitherto it has been difficult to recover the elastomeric material from the remaining portion of the article. For instance, vehicle tires are generally reinforced with textile chord and steel belts and hitherto it has been difficult to separate the desirable rubber from the reinforcement.

Earlier attempts to reclaim rubber from vehicle tires comprised the steps of grinding the vehicle tire to a small particle size followed by magnetic separation of the metallic reinforcement and screen separation of the non-metallic reinforcement (i.e. textile chord reinforcement). This process is cumbersome and expensive and results inefficient separation of the various components. Separation could be facilitated by softening the rubber before grinding by contacting the rubber with one or more solvents.

It has now been found that rubber and other elastomeric material can be more conveniently removed from articles by initially softening the rubber or elastomeric material on the article and then subjecting the article to shear conditions to remove the rubber of elastomeric material from the article. In this manner, grinding, magnetic separation and screen separation is not required.

It has further been found that the recovered elastomeric material can be carbonized by further radiation steps preferably using microwave radiation.

DISCLOSURE OF THE INVENTION

It is an object of the invention to provide a method and apparatus which may at least partially alleviate the abovementioned disadvantages.

In one form, the invention comprises a method for recovering elastomeric material from articles containing such material comprising the steps of:

Softening said elastomeric material by contacting said article with at least one fluid which absorbs into said elastomeric material, At least partially removing said softened elastomeric material from said article by a shearing means, Recovering the removed softened elastomeric material, and At least partially removing said at least one fluid from the elastomeric material.

Articles containing such elastomeric material suitably include vehicle tires, conveyor belts, rubberised fabrics, and elastomeric materials reinforced with metal, wires, filaments and the like.

The article containing the elastomeric material may be required to be precut or shredded to a processable size. Thus, vehicle tires are generally coarsely shredded by any conventional shredding apparatus.

Suitable elastomeric materials include those capable of being softened by absorbing liquids into the elastomeric material. These materials may include synthetic or natural rubbers, modified rubbers, vulcanised rubbers, neoprenes, isoprenes, compositions of natural or synthetic rubbers, homopolymers or copolymers of conjugated diene hydrocarbons, homopolymers or copolymers or chloroprene, carboxylated rubbers, halogeneated rubbers, silicones, ABS elastomers, EP and EPT rubbers, cross-linked, graft, block or interpenetrating elastomers.

Suitably, the at least one fluid is a liquid selected from hydrocarbons, nitrohydrocarbons, alcohols, ethers, ketones, esters, glycols and glycol ethers, cycloalkyl alcohols, esters and ketones, chlorinated hydrocarbons, cyclic ethers and aldehydes and mixtures thereof.

Preferred liquids in these classes include benzene, toluene, xylene, tetrohydronaphthalene, decahydronaphtalene, dipentene, petroleum liquids, naphtha liquids, nitropropane, methyl alcohol, ethyl alcohol, N-propyl alcohol, N-butyl alcohol, isobutyl alcohol, sec-butyl alcohol, amyl alcohol, benzyl alcohol, diacetone, diethyl ether, diisopropyl ether, acetone, methyl isobutyl ketone, methyl acetate, ethyl acetate, N-butyl acetate, amyl acetate, hexyl acetate, amyl formate, ethyl lactate, butyl glycollate, methyl benzoate, butyl stearate, dimethylphthalate, dibutylphthalate, dibutylsebacate, methylabietate, ethylene glycol, ethylene glycol monomethyl ether, ethylene glycol monoethyl ether, ethylene glycol ethyl ether acetate, ethylene glycol monobutyl ether, ethylene glycol ethyl ether acetate, ethylene glycol monobutyl ether, diethylene glycol, diethylene glycol monoethyl ether, propylene glycol, clclohexanol, cyclohexanol acetate, cyclohexanone, methyl cyclohexanone, methylene dichloride, chloroform, carbon tetrachloride, dichloroethane, perchloroethane, dichloroethylene, trichloroethylene, perchloroethylene, mono chlorobenzene, dichloroethylether, 1,1,2,-trichlorotrifluroethane, dioxane and furfural.

Preferred liquids include toluene and xylene used alone or in mixture with each other or with other liquids. Other preferred liquids include Shellsol A, Shellsol 1021 and water. The preferred liquids may be mixed with inert liquids of high boiling point such as halogenated hydrocarbons.

The elastomeric material may be softened by partial or full immersion of the article containing the elastomeric material into the liquid or mixture of liquids. The process is generally not very sensitive to temperature and may be carried out at room temperature or any other temperature between the freezing and boiling point of the liquid or liquid mixture. The actual temperature will be determined by convenience and also by the nature of the elastomeric material to be softened. Thus, certain elastomeric materials are temperature sensitive and prolonged immersion into the liquid or liquid mixture at high temperature may result in partial or total degradation of the elastomeric material.

Alternatively, the elastomeric material may contact the at least one fluid in the vapour state suitably under pressure to soften the elastomeric material.

The article containing the elastomeric material may be partially or fully contacted with the liquid or liquid mixture for sufficient time to cause the elastomeric material to be softened. The contact time depends on the size of the component containing the elastomeric material and on the type of elastomeric material to be softened. Typically, the elastomeric material shows substantial softening after approximately three hours. For cross-linked or other elastomeric material exhibiting a smaller amount of elasticity, this time it may be exceeded and may require above ambient temperatures.

The article containing the elastomeric material may be contacted by the liquid or mixture of liquids by immersion of the component into a tank containing the liquid or mixture of liquids. The tank may be provided with an agitator and heating elements to heat the liquid. Alternatively, the article can be contacted with the liquid or mixture of liquids through sprayers, or in the vapour state.

The shearing means suitably comprises two relatively moving bodies between which the article is passed. In this manner, the softened elastomeric material is sheared away from the non-elastomeric portion of the article such as the reinforcement without requiring grinding of the article.

Suitably, the shearing means comprises a screw conveyor and therefore the invention includes in a further form an apparatus for recovering softened elastomeric material from articles containing such material, the apparatus comprising a screw conveyor having an elongate shaft and a spirally configured flight to define a material communicating pathway, said screw conveyor being at least partially accommodated within a housing and rotatable relative thereto about its longitudinal axis, the area defined by the material communicating pathway and the wall of the housing decreasing in the direction of conveyancing, said housing having one or more exit apertures in communication with said pathway through which the removed softened elastomeric material can pass.

The screw conveyor may be of any length convenient for the conveying of articles containing the softened elastomeric material. The elongate shaft is generally of a circular cross-sectional configuration although other configurations are also possible. A spirally configured flight is provided around the periphery of the elongate shaft. The flight may extend substantially along the length of the shaft. The flight may extend in a perpendicular fashion from the periphery of the elongate shaft or may be inclined in either direction thereto. The spacing between adjacent turns of the flight may be varied along the length of the shaft to vary the speed of the material being conveyed along the conveyor. The material communication pathway defined by adjacent turns of the spirally configured flight and the periphery of the elongated shaft can be of any cross-sectional configuration. If the shaft is of circular cross-section and the flights extend in a perpendicular fashion therefrom, the pathway will be of a substantially U shaped cross-sectional configuration. However, other configurations such as "V" shaped may also be used.

A pair of screw conveyors may be used to subject the softened elastomeric material to shear conditions. The screw conveyors may be in a parallel spaced configuration. The spacing between the screw conveyors can be adjusted to minimize cutting of the reinforcement while subjecting the elastomeric material to shear conditions. One of the pair of screw conveyors preferably rotates in a counter-rotational fashion relative to the other.

The flight of the screw conveyor may comprise a sharpened edge along part of its length to facilitate separation of the elastomeric material from the article.

The conveyor is rotatable about its longitudinal axis and can be mounted for such rotation by any method. The shaft can be rotated by any form of drive member. Preferably, the drive member comprises an electric motor which may be directly coupled to one end of the shaft or indirectly coupled thereto through drive belts or gears.

At least part of the conveyor is accommodated within a housing. The housing may accommodate substantially the entire length of the conveyor but preferably only accommodates about half of the conveyor.

The housing may be of an open ended tubular configuration having an internal size slightly larger than one size of the screw conveyor thereby resulting in a close fit between the inner wall of the housing and the peripheral edge of the flight.

The housing may be provided with an array of exits apertures in communication with the material communication pathway and through which the softened elastomer passes. The exit apertures may be in the form of slits or slots which may be of a substantially circular or elongate configuration. The apertures may extend along the entire length of the wall of the housing between the ends thereof. The apertures may be randomly placed or ordered along the wall of the housing. The size of the apertures may vary depending on the position along the housing. Thus the apertures at or adjacent one end of the housing may be of a different size than the apertures at or adjacent the other end of the housing. The housing may contain a higher number of apertures per area at one portion therealong than at another portion. Alternately, the apertures may be located only at or adjacent one end of the housing.

The apertures may extend at an angle through the housing. The angle may be in line with the direction of conveyancing of material in the screw conveyor. Thus, the apertures may be forwardly directing. The apertures may have a tapered internal profile. The portion of the aperture at or adjacent the inner face of the housing may be provided with a sharpened edge which may facilitate the removal of the softened elastomeric material from the component containing the material being conveyed along the screw conveyor.

The area defined between adjacent turns of the flight, the surface of the shaft and the inner wall of the housing decreases in the direction of conveyancing of the screw conveyor. The area may decrease due to an increase in the cross-sectional area of the shaft along its length. The decrease in the area can be further facilitated by a reduction in the height of the flight along the length of the shaft. Alternately, the shaft and/or flight can remain constant throughout the length of the conveyor and the housing can be provided with an internal spirally configured thickened bead or ridge which mates between adjacent turns of the flight of the screw conveyor thereby affecting the decrease in the area of the material communication pathway. A further alternative is to provide a screw conveyor which tapers outwardly along its length and which locates within a housing of constant cross-section along its length.

The end of the housing at or adjacent the exit portion of the screw conveyor may be open ended to allow removal of the non-elastomeric material. The other end of the housing may be connected to a hopper or other means to allow material to be fed onto the screw conveyor.

The removed softened elastomeric material may be collected and part or all of the absorbed liquid can be removed. Removal of the absorbed liquid can be carried out by a variety of suitable techniques including rotatory kiln drying, radiation drying such as microwave drying and/or squeeze drying.

The dried or partially dried elastomeric material may be subject to further sizing steps by grinding and/or screening to provide a product of substantially uniform particle size.

In a further step, the recovered elastomeric material may be carbonized by subjecting it to radiation suitably in the form of microwave radiation.

Thus, in another form, the invention resides in an apparatus for carbonizing elastomeric material, said apparatus comprising a rotatable chamber having a first inlet means and first outlet means to allow elastomeric material to enter into and exit from removed from said chamber, second inlet means to allow microwave radiation to enter into said chamber, and second outlet means to allow liberated vapors/gases to be removed from said chamber.

Suitably, the chamber comprises an elongate body having a polygonal cross-section which is preferably hexagonal.

The polygonal cross-sectional configuration of the body facilitates dispersion of microwaves entering into the chamber from the second inlet means by reflection of the microwaves from the internal walls of the polygonal body.

The polygonal body suitably comprises end faces having extensions which can be associated with bearings to allow the body to rotate about its longitudinal axis.

The chamber is suitably rotated by a drive means which may be directly or indirectly coupled to the rotatable chamber.

Suitably the elastomeric material passes into and from the chamber along a continuous conveyor belt system.

Suitably, the first inlet means and first outlet means comprise a common access opening located on the elongate body through which the reclaimed rubber can be placed into and removed from the chamber.

A microwave generating means is suitably located remote from the apparatus and microwaves can be channeled from the microwave generating means to the second inlet means through suitable microwave conduit such as aluminium pipe.

The second outlet means suitably comprises a passageway extending through one of the extensions associated with the end faces of the chamber. To facilitate removal of any gases liberated upon microwave radiation of the rubber within the chamber, a pump means may be associated with the chamber. The pump means preferably comprises a vacuum pump associated with the second outlet means. The removed gases may be separated by suitable filters or traps.

DESCRIPTION OF THE DRAWINGS

FIG. 3 is a side view of the apparatus of FIG. 2.

FIG. 4 is a view of a screw according to a preferred embodiment of the invention which is used in association with the shearing apparatus as illustrated in FIGS. 2 and 3.

BEST MODE OF PERFORMING THE INVENTION

Figure 1:
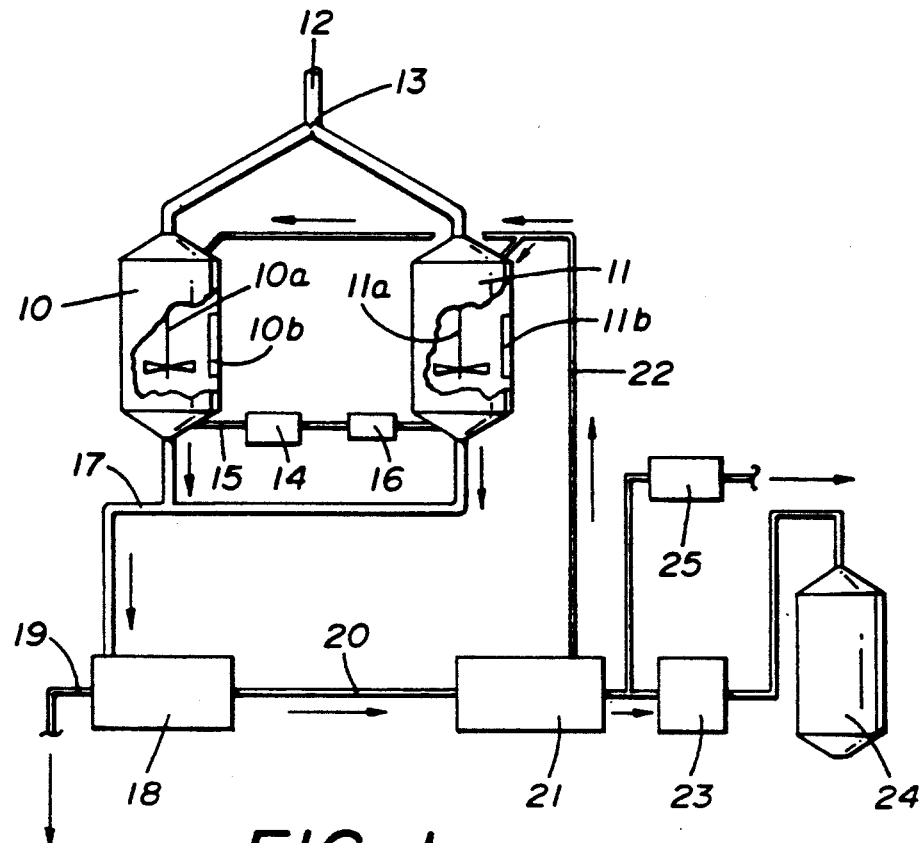
FIG. 1 is a schematic diagram of a method of recovering elastomeric material according to a preferred embodiment of the invention.

Referring to FIG. 1 there is disclosed diagrammatically various components used in a preferred method to recover elastomeric material.

Specifically, FIG. 1 discloses a soaking tank 10 which is partially filled with toluene (Shellsol 1021) as the absorbing liquid. Articles containing elastomeric material such as vehicle tires are suitably initially pre-cut (not shown) into lengths of approximately 30 cm for ease of handling of the tires although this is not essential. The articles can conveniently be cut or shredded by any conventional shredding or cutting apparatus.

The pre-cut tires are passed into soaking tank 10 along feed line 12 and valve 13. Soaking tank 10 includes an agitator 10a and a heater 10b.

The pre-cut tires are kept in contact with the toluene in the tank for approximately 24 hours at room temperature and with agitation whereafter the rubber in the tires is considerably softened. The toluene in soaking tank 10 is pumped into soaking tank 11 along feed line 15 by pump 14. A filter 16 filters the toluene as it is pumped between tanks 10 and 11 to remove any dirt or grime or other loose material which enters the soaking tanks together with the pre-cut tires.

Thereafter, a further batch of pre-cut tires can be conveyed into soaking tank 11 through feed line 12 and valve 13. Soaking tank 11 also includes an agitator 11a and neater 11b.

The softened pre-cut tires in soaking tank 10 are removed from the tank and conveyed along 17 to a shearing means which in the embodiment comprises a screw conveyor 18 as more clearly described with reference to FIGS. 2-4.

Screw conveyor 18 shears the softened elastomeric material from the tire reinforcement as is more clearly described below and separates the softened elastomeric material from the reinforcement. The reinforcement is passed from the screw conveyor at outlet 19 and can be collected and removed.

The separated softened elastomeric material is conveyed along 20 into a microwave dryer 21 which drives off the absorbed toluene liquid. The softened mixture is mixed with a small amount of water before drying and is initially ground to a smaller size to increase its surface area. The removed toluene liquid can be recovered and returned to soaking tanks 10 and 11 through feed line 22.

Figure 6:
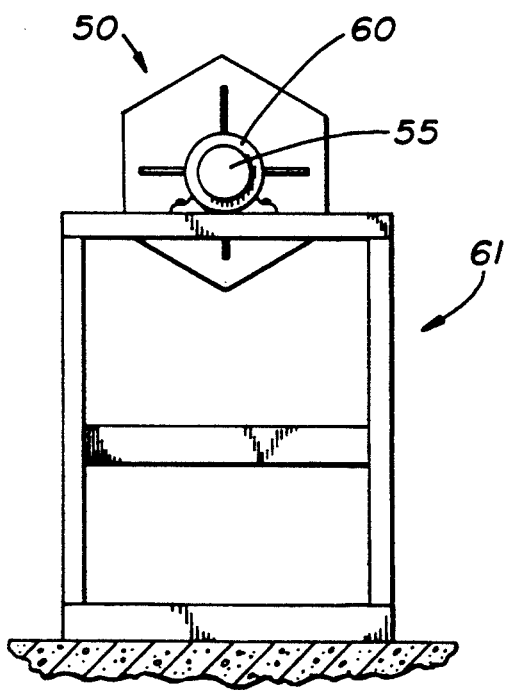
FIG. 6 is an end view of the apparatus of FIG. 5.

The dried elastomeric material can be further sized by grinding in a grinder 23 before being passed into a storage silo 24, or can be carbonized in a microwave drier 25 as will be described in more detail below with reference to FIGS. 5 and 6.

All the components as illustrated in FIG. 1 are static proofed for a sparkless environment, and are fully enclosed and attached with vapour recovery exhausts passing through activated carbon filters.

The elastomeric material so recovered can be reused and does not exhibit appreciable degradation relative to untreated elastomeric material.

For instance, a rubber sample obtained from a motor vehicle tire, prior to any softening treatment generally has a Shore hardness of approximately 60. After soaking for 5 to 6 hours in toluene at room temperature, the Shore hardness is reduced to approximately 10. At this value, the rubber sample was friable and easily broken and could thereby be removed from the reinforcement by subjecting the sample to shear conditions as discussed above. After recovery of the rubber and drying thereof, the recovered rubber is found to have a shore hardness only slightly less than that of the original material.

The other properties of the separated elastomeric material remain essentially unchanged and can be used to replace up to 15% of virgin rubber in the manufacture of car tires or other products.

Table 1 give the properties of recovered tire rubber ground to micron size with reference to buffing dust of similar size and which is formed from untreated tire rubber.

TABLE 1

| Components | Buffing dust | Recovered tire rubber |
|---|---|---|
| Acetone extractables | 18.5 | 33.0 |
| Ash | 2.9 | 2.6 |
| Total Sulphur | 1.3 | 2.2 |
| Carbon black | 30.2 | 25.3 |
| Rubber Hydrocarbons | 47.1 | 36.9 |
| Specific gravity | 1.29 | 1.32 |

The analysis was based on ASTM D297-76.

The ash consisted of mainly silicon, zinc and iron with calcium, magnesium and aluminium as minor components.

Figure 2:
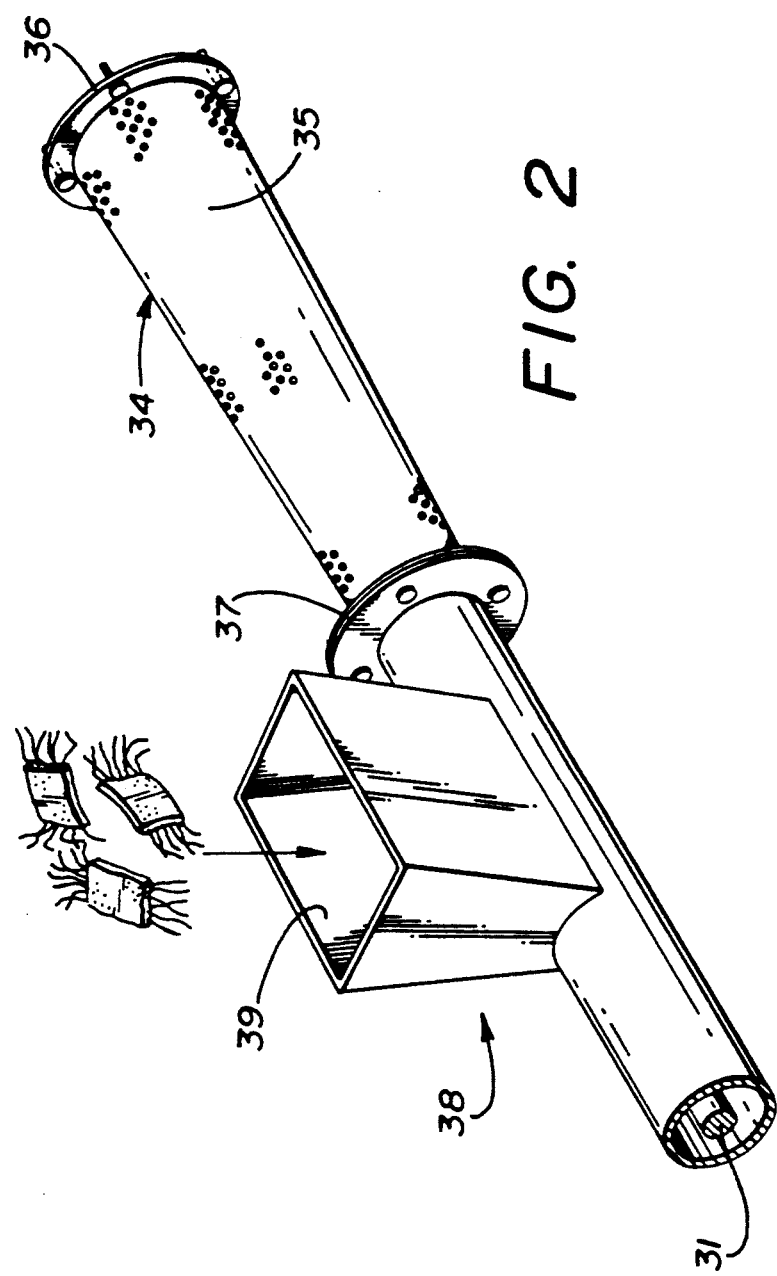
FIG. 2 is a view of a shearing apparatus according to preferred embodiment of the invention to remove softened elastomeric material from the remainder of the article.

FIGS. 2-4 disclose a preferred shearing means. The shearing means comprises a screw conveyor 30 (see FIG. 4) having an elongate shaft 31 and a spirally configured flight 32 extending about shaft 31 to define a material communication pathway 33.

The screw conveyor 30 is mounted for rotation within a housing 34 which extends around second half of the screw conveyor 30. Housing 34 comprises an elongate outwardly tapering hollow cylinder having a peripheral wall 35, an open exit 36 and an open inlet 37. The peripheral wall 35 is provided with an array of apertures 40 spaced along and around the wall. The open inlet 37 is coupled to a hopper 38 including an entry box 39 into which articles to be conveyed along the screw conveyor can be placed. The entry box is in communication with the first portion of the screw conveyor 30.

Shaft 31 of the screw conveyor is of constant cross-section for the initial portion of the conveyor and then tapers outwardly towards the exit portion of the conveyor. The walls of the spirally configured flight 32 also decrease in height along the tapered portion of shaft 31.

Upon insertion of the screw conveyor into housing 34, the material communication pathway 33 is defined by the walls of flight 32, the periphery of shaft 31, and the inner wall of housing 34, and due to the outward tapering of shaft 31, the area of pathway 33 decreases from the entry 37 to exit 36 of the housing.

To separate softened elastomeric material from articles containing such material, the articles (pre-cut if necessary) are fed into entry box 3° and onto the initial portion of conveyor 30. Upon rotation of conveyor 30, the material is conveyed therealong towards exit 36. As the area of the pathway decreases, the articles containing the softened elastomeric material are increasingly subjected to shear conditions resulting in partial removal of the softened elastomeric material from the remainder of the article. The softened elastomeric material is forced through apertures 40 due to the ever decreasing area of the communication pathway. At outlet 36 the components which are not able to be forced through apertures 40 exit the conveyor. These components include the steel reinforcement and textile chord of tires or conveyor belts etc.

A small amount of softened elastomeric material may also pass through outlet 36 which may then be separated by conventional means or if necessary, the outlet material can be reintroduced onto the conveyor.

Figure 5:
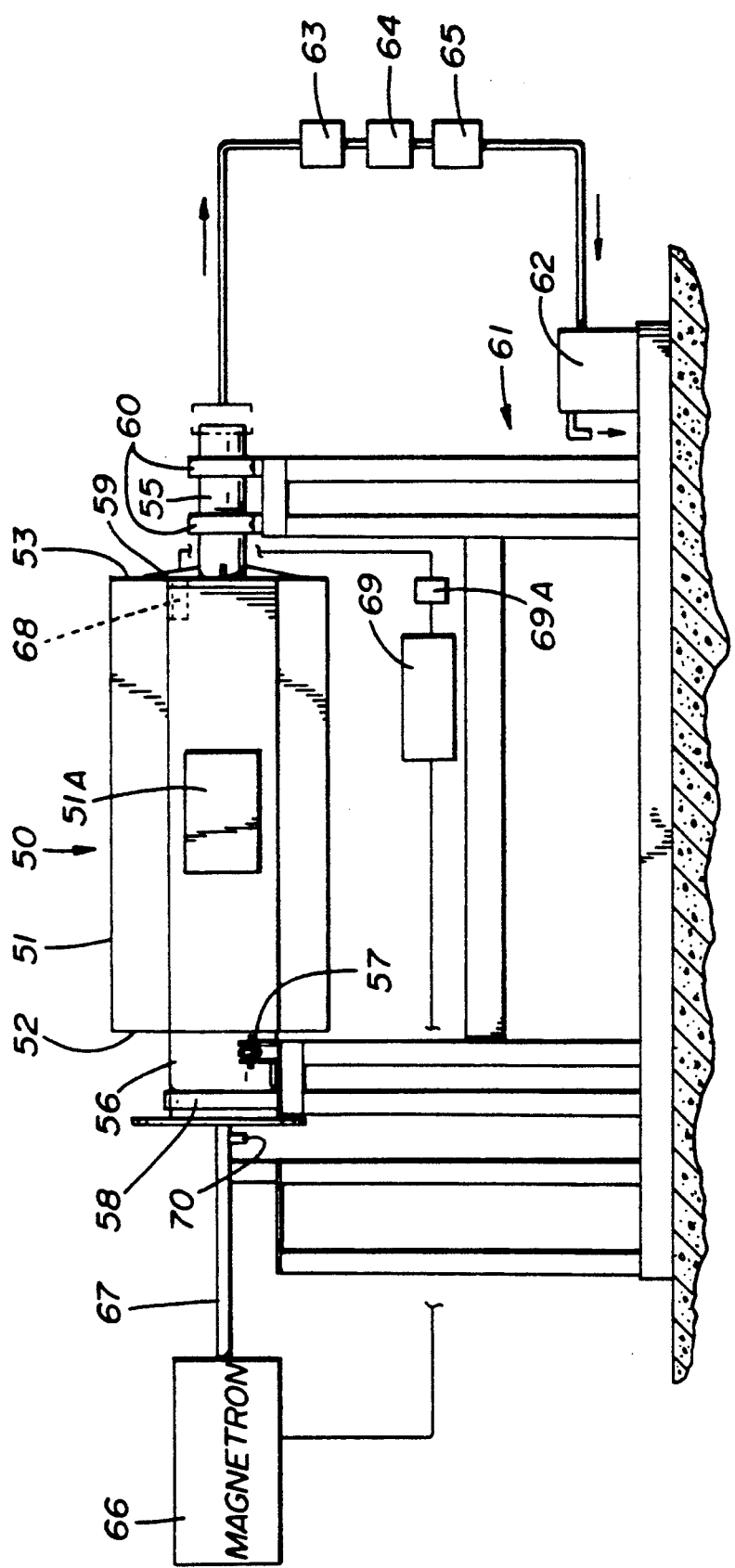
FIG. 5 is a side view of an apparatus for carbonizing elastomeric material according to an embodiment of the invention.

Referring to FIG. 5 there is disclosed an apparatus for carbonizing elastomeric material. The apparatus is particularly suitable for carbonizing reclaimed rubber to form carbon black.

The apparatus comprises a rotatable chamber 50 comprising an elongate body 51 having a hexagonal cross-sectional configuration and two end faces 52, 53.

In the preferred embodiment, the elongate body has a length of about 1.2 meters and each hexagonal side panel is approximately 40 cm in width.

Chamber 50 is provided with an access hatch 51A with functions as a first inlet means and first outlet means to allow material to enter into or exit from the chamber. The access hatch includes a door.

Chamber 50 is mounted for rotation about its elongate axis through extensions 55, 56b which extend outwardly from each end face of the chamber.

Extension 56 is supported by rollers 57 (only one shown) and has a pulley like configuration to accept a drive belt 58 which connects extension 56 to a drive means (not shown).

Extension 55 comprises an elongate tube which is secured to end face 53 through mounting plate 59. Tube 55 abuts against end face 53 and a series of holes (not shown) are formed in end face 53 such that the interior of tube 55 is in communication with the interior of chamber 50 with the holes functioning to prevent material in the chamber from exiting through tube 55.

Tube 55 is supported for rotation by a pair of spaced bearings 60. A subframe assembly shown generally as 61 supports the chamber and extensions in a substantially horizontal orientation.

Hollow tube 55 functions as the second outlet means to remove any gases which are liberated upon radiation of material inside chamber 50. To facilitate removal of such gases, a vacuum pump 62 is connected to tube 55 through suitable conduit. Any liberated gases may be collected and/or separated through a series of filters and/or traps 63-65.

A microwave generating means 66 generates a source of microwaves which are channelled through an aluminium pipe 67 into chamber 50. Pipe 67 extends through a suitable passage in extension 56 and is in radiation communication with the interior of chamber 50.

To carbonize recovered rubber, the rubber material is added to chamber 50 through hatch 54. The apparatus can accommodate up to 200 kg of rubber material. Thereafter, chamber 50 is rotated about its longitudinal axis by a drive means which drives a V belt 58 which extends around extension 56. Microwaves are generated and are introduced into chamber 50 through aluminium pipe 67. The hexagonal configuration of chamber 50 results in microwaves reflecting off the walls of the chamber to provide an even distribution of microwaves.

Typically, 5 kv of microwave radiation is passed into chamber 50 and results in the temperature of the rubber material in the chamber being raised to approximately 900°- C.-1200° C. As rubber absorbs microwave energy but is a poor conductor, the microwave radiation is intermittently introduced into chamber 50 to ensure that the rubber material does not overheat and combust. To regulate the microwave energy in chamber 50, an infra red temperature sensor 68 monitors the temperature of the material within the chamber and provides a signal to a microprocessor 69 through interface 69a, which in turn regulates the intensity of microwave radiation entering into chamber 50 to maintain the temperature at about 900° C.-1200° C.

To further minimise the possibility of combustion of the rubber material in chamber 50, there is provided a gas inlet 70 through which a non-combustible gas such as argon or nitrogen can pass to deoxygenate the interior of chamber 50.

Upon continued microwave radiation of the rubber material in the chamber, the process of carbonization takes place and considerable volatile products are released. These products are pumped from chamber 50 by vacuum pump 62 through filters 63-65. Filter 63 comprises a wool filter to trap any solid for liquid material. Filter 64 comprises a water trap and filter 65 comprises an activated carbon filter. The combination of the filters ensures that only clean air is exhausted from vacuum pump 62.

Upon completion of the carbonization product, the initial batch of rubber material has lost between 45% to 50% of its initial weight and considerable amounts of liquid hydrocarbons are trapped within filters 63-65. Typically, the carbonization process liberates approximately 1 liter of oil and hydrocarbons for each 2 kg of rubber. The rubber will start releasing volatiles at 120° C.-140° C.

The trapped oil and hydrocarbons can be removed and purified and as one option can be burnt to provide a further source of carbon black.

The resultant carbonized product can be removed from chamber 50 and if required can be further sized by grinding to provide a uniform particle size.

In a modification, the rubber can be continuously carbonized by adding the rubber to a conveyor belt which passes through different zones of microwave heating. The whole system is enclosed and volatiles can be removed by a pump and separated as described above.

Test data provides the carbon black formed in this manner with the following properties as illustrated in Table 2:

TABLE 2

| Sample | LoI (550° C.) | Fe | Cr | Mn | Zn | Cu | Ni | Al | Pb | Mo |
|--------|---------------|------|------|------|------|------|------|------|------|------|
| A | 94.8 | 0.22 | 0.01 | 0.01 | 0.38 | 0.05 | 0.01 | 0.20 | 0.01 | 0.01 |
| B | 82.6 | 0.30 | 0.01 | 0.01 | 1.1 | 0.01 | 0.01 | 0.46 | 0.01 | 0.01 |
| C | 90.8 | 0.25 | 0.25 | 0.01 | 3.7 | 0.01 | 0.01 | 0.01 | 0.06 | 0.01 |

Sample A comprises carbon black formed by microwave radiation treatment of reclaimed tire rubber after acid washing with 5% Hcl.
Sample B - is a reference sample of carbon black formed by burning commercial oil.
Sample C - comprises the carbon black of sampls A prior to acid washing.

Samples A and C had silicate values of 4.6 and 3.7 respectively. Thus it can be seen that carbon black formed by microwave radiation treatment of recovered tire rubber is virtually indistinguishable from carbon black conventionally formed by burning commercial oil.

The carbonated product can be further crystalised to graphite in a further step of heating the carbonated material to a temperature of 2500° C. at a pressure of between 1500-3000 psi for approximately 1 month.

The carbonated product can be utilized in a large number of applications as a substitute for carbonated products such as carbon black which is made from burning of fossil fuels.

The applications may also include utilization in chipboard products, firedoors, ceiling tiles, insulation, moulds, paints, oil absorbers, filters, activated carbon, rustproofing, plastics mouldings, exhaust filters, graphite, anti-fouling, potting mix for orchards, composing, shingles, rubberized paving blocks, bowling mats, tennis court surfaces, carpet underlay and asphalt.

As carbon has a very high melting point 3727° C. and does not burn, it can be used to manufacture fire rated products such as fire resistant paper or cardboard products.

The recovered rubber need not be carbonized but can itself be used as a substituted for virgin rubber.

Thus, the invention provides a simple method for utilizing used car tires to form a usable product.

Various other changes and modifications can be made to the embodiments described without departing from the spirit and scope of the invention as claimed.

I claim:

1. A method for recovering elastomeric material from articles containing such material comprising the steps of
    softening said elastomeric material by contacting said article with at least one fluid which absorbs into said elastomeric material,
    at least partially removing said softened elastomeric material from said article by a shearing means,
    recovering said removed softened elastomeric material,
    at least partially removing said at least one fluid from the elastomeric material, and carbonizing the recovered elastomeric material by subjecting it to microwave radiation sufficient to cause carbonization of the elastomeric material.

2. The method as claimed in claim 1 wherein said at least one fluid is selected from hydrocarbons, nitrohydrocarbons, alcohols, ethers, ketones, esters, glycols and glycol ethers, cycloalkyl alcohols, esters and ketones, chlorinated hydrocarbons, cyclic ethers and aldehydes and mixtures thereof.

3. The method as claimed in claim 2 wherein said at least one fluid is selected from toluene or xylene.

4. The method as claimed in claim 1 wherein said elastomeric material is selected from synthetic rubber, natural rubber, modified rubber, vulcanised rubber and mixtures thereof.

5. The method as claimed in claim 1 wherein said article comprises reinforced vehicle tires such as car tires and truck tires.

6. The method as claimed in claim 1 wherein said shearing means comprises two relatively moving bodies between which the article is passed.

7. The method as claimed in claim 6 wherein said shearing means comprises a screw conveyor having an elongate shaft and a spirally configured flight to define a material communicating pathway, said screw conveyor being at least partially accommodated within a housing and rotatable relative thereto about its longitudinal axis, the area defined by the material communicating pathway and the wall of the housing decreasing in the direction of conveyancing, said housing having one or more exit apertures in communication with said pathway through which the removed softened elastomeric material can pass.

8. The method as claimed in claim 7 wherein said article is communicated by said screw conveyor along the material communicating pathway whereby the elastomeric material is sheared from the non-elastomeric portion of the article by contact between the rotating shaft and the housing and the elastomeric material is forced through said exit apertures due to the decreasing area of the material communicating pathway in the direction of travel.

9. The method as claimed in claim 1, wherein said at least one fluid is removed from the elastomeric material by air drying or radiation drying.

10. The method as claimed in claim 9, wherein said at least one fluid is removed from the elastomeric material by subjecting the recovered elastomeric material to microwave radiation sufficient to evaporate the absorbed at least liquid.

11. The apparatus as claimed in claim 10 wherein said dried recovered elastomeric material is further sized to a uniform particle size.

12. The method as claimed in claim 1 comprising the further step of carbonizing the recovered elastomeric material by subjecting it to microwave radiation sufficient to cause carbonization of the elastomeric material.

13. The method as claimed in claim 1 wherein the recovered elastomeric material is carbonized in an apparatus comprising a rotatable chamber having a first inlet means and a first outlet means to allow elastomeric material to enter into and exit from said chamber, second inlet means to allow microwave radiation to enter into said chamber, and second outlet means to allow liberated vapours/gases to be removed from said chamber.

14. The method as claimed in claim 13 wherein said chamber comprises an elongate body having a polygonal cross section.

15. The method as claimed in claim 14 wherein said chamber is of hexagonal cross section.

* * * * *

UNITED STATES PATENT AND TRADEMARK OFFICE
CERTIFICATE OF CORRECTION

PATENT NO. : 5,316,224
DATED : May 31, 1994
INVENTOR(S) : John Dobozy

It is certified that error appears in the above-identified patent and that said Letters Patent is hereby corrected as shown below:

In Column 1, line 58, delete "of" and substitute therefor ---or---;

In Column 6, line 31, delete "tilled" and substitute therefor ---filled---;

In Column 8, line 43, delete "with" and substitute therefor ---which---;

In Column 8, line 47, delete "56b" and substitute therefor ---56---;

In Column 9, line 32, delete "900°-C.-1200° C." and substitute therefor ---900° C.-1200° C.---;

In Column 9, line 53, delete "for" and substitute therefor ---or---;

In Column 10, the last line of Table 2, delete "sampls" and substitute therefor ---sample ---;

In Column 10, line 43, delete "composing" and substitute therefor ---composting---;

In Column 10, line 46, delete "point 3727° C." and substitute therefor ---point of 3727° C.---; and

UNITED STATES PATENT AND TRADEMARK OFFICE
CERTIFICATE OF CORRECTION

PATENT NO. : 5,316,224
DATED : May 31, 1994
INVENTOR(S) : John Dobozy

It is certified that error appears in the above-indentified patent and that said Letters Patent is hereby corrected as shown below:

Column 10, line 51, delete "substituted" and substitute therefor-- substitute--.

Signed and Sealed this

Twentieth Day of September, 1994

Attest:

BRUCE LEHMAN

Attesting Officer

Commissioner of Patents and Trademarks